(12) United States Patent
Tokiwa et al.

(10) Patent No.: US 9,027,687 B2
(45) Date of Patent: May 12, 2015

(54) CAB, AND WORK VEHICLE

(71) Applicant: Komatsu Ltd., Tokyo (JP)

(72) Inventors: Satoru Tokiwa, Komatsu (JP); Naoki Kimura, Komatsu (JP); Masahiko Hamaguchi, Nomi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/351,223

(22) PCT Filed: May 15, 2013

(86) PCT No.: PCT/JP2013/063518
§ 371 (c)(1),
(2) Date: Apr. 11, 2014

(87) PCT Pub. No.: WO2014/184891
PCT Pub. Date: Nov. 20, 2014

(65) Prior Publication Data
US 2014/0339001 A1    Nov. 20, 2014

(51) Int. Cl.
*B60H 1/00* (2006.01)
*F24F 13/02* (2006.01)

(52) U.S. Cl.
CPC .. *B60H 1/00378* (2013.01); *B60H 2001/00221* (2013.01); *B60H 2001/00192* (2013.01); *F24F 13/02* (2013.01); *B60H 1/00028* (2013.01)

(58) Field of Classification Search
CPC .. B60H 1/00378; B60H 1/00028; B60H 1/00; B60H 2001/00185; B60H 2001/00192; B60H 2001/00221; F24F 13/02
USPC ............ 180/89.12, 68.2; 123/184.59, 184.21, 123/41.04, 41.58; 454/69
See application file for complete search history.

(56) References Cited

U.S. PATENT DOCUMENTS

| 8,739,752 B2 * | 6/2014 | Honzawa et al. ........ 123/184.59 |
| 2006/0006696 A1 | 1/2006 | Umemoto et al. |
| 2006/0199492 A1 * | 9/2006 | Ozeki ............................. 454/69 |

(Continued)

FOREIGN PATENT DOCUMENTS

| JP | 2-144812 U | 12/1990 |
| JP | 4-123707 U | 11/1992 |

(Continued)

OTHER PUBLICATIONS

Tomonari Matsuura, In-Cabin Air COnditioning Equipment for Industrial Vehicle, Dec. 7, 1990, JP 02-144812 U, Translation of Application.*

(Continued)

*Primary Examiner* — James English
(74) *Attorney, Agent, or Firm* — Global IP Counselors, LLP

(57) ABSTRACT

A first blowing section is arranged inside a cab body on a right side, and blows cool air or warm air. A second blowing section is arranged inside a cab body on a left side, and blows cool air or warm air. An inlet, a first vent, and a second vent are formed in a box body of a distribution box. The inlet opens toward the left side and introduces cool air or warm air from an air-conditioning unit. The first vent opens toward the right side. The second vent opens downward. A first duct, which is connected to the first vent, supplies the first blowing section with cool air or warm air. A second duct, which is connected to the second vent and extends beneath a seat, supplies the second blowing section with cool air or warm air.

20 Claims, 9 Drawing Sheets

(56) References Cited

U.S. PATENT DOCUMENTS

| | | | | |
|---|---|---|---|---|
| 2007/0158047 | A1* | 7/2007 | Natsume | 165/43 |
| 2008/0163634 | A1* | 7/2008 | Yoshii | 62/244 |
| 2008/0314061 | A1* | 12/2008 | Nagami et al. | 62/244 |
| 2011/0250832 | A1* | 10/2011 | Mayr et al. | 454/237 |
| 2013/0118708 | A1* | 5/2013 | Ichikawa | 165/59 |
| 2014/0124280 | A1* | 5/2014 | Kimura et al. | 180/89.12 |

FOREIGN PATENT DOCUMENTS

| | | |
|---|---|---|
| JP | 2006-8076 A | 1/2006 |
| JP | 2006-264440 A | 10/2006 |
| JP | 2009-12700 A | 1/2009 |
| JP | 2009-113560 A | 5/2009 |
| JP | 2011-225110 A | 11/2011 |

OTHER PUBLICATIONS

The International Search Report for the corresponding international application No. PCT/JP2013/063518, issued on Aug. 6, 2013.

The Japanese Office Action for the corresponding Japanese application No. 2013-555110, issued on Apr. 1, 2014.

* cited by examiner

CAB, AND WORK VEHICLE

CROSS-REFERENCE TO RELATED APPLICATIONS

This application is a U.S. National stage application of International Application No. PCT/JP2013/063518, filed on May 15, 2013.

BACKGROUND

1. Field of the Invention

The present invention relates to a cab, and to a work vehicle.

2. Background Information

The cab in a work vehicle, such as a motor grader, is provided with an air-conditioning unit for cooling or heating the inside of the cab body as is exemplified in Japanese Unexamined Patent Application Publication Number 2011-225110. The air-conditioning unit cools the air inside the cab body to generate cool air, and blows the generated cool air out from venting ports via a duct. The above-mentioned air-conditioning unit may generate not only cold air but also warm air.

SUMMARY

Installing multiple ducts in the above described work vehicle tends to be difficult, considering the space inside the cab body. Therefore, there is a tendency to blow cold air from only one side of a driver sitting in a seat inside the cab body. However, it would be more comfortable for the driver if cool air were blown onto the driver from both sides, instead of from one side. Therefore, although it would be possible to provide a duct to vent cool air toward another side in the cab to blow cool air onto the driver from that other side, the space inside the cab body must be reduced for the ducts to be fed through the cab body.

The present invention addresses the problem of retaining space inside the cab body while being able to blow cool air or warm air on the driver from both sides.

A work vehicle according to a first aspect of the present invention is provided with a cab body, a seat, an air-conditioning unit, a first blowing section, a second blowing section, a distribution box, a first duct, and a second duct. The cab body includes a floor. The seat is installed inside the cab body. The air-conditioning unit is arranged on the floor beneath the seat. The first blowing section is arranged inside the cab body on a first side in the vehicle width direction, and blows air from the air-conditioning unit. The second blowing section is arranged inside the cab body on a second side opposite the first side, and blows air from the air-conditioning unit. The distribution box includes a box body.

An inlet, a first vent, and a second vent are formed in the box body. The inlet opens toward the second side and introduces air from the air-conditioning unit.

The first vent opens toward the first side. The second vent opens downward. The first duct, which is connected to the first vent, supplies the first blowing section with air from the air-conditioning unit. The second duct, which is connected to the second vent and extends toward the second side, supplies the second blowing section with air from the air-conditioning unit.

According to this configuration, the first blowing section blows air from the air-conditioning unit onto an operator sitting in the seat from the first side in the vehicle width direction. Furthermore, the second blowing section blows cool air or warm air onto the operator sitting in the seat from the second side opposite the first side. In this manner, air from the air-conditioning unit is blown onto the operator from both sides using the first blowing section, and the second blowing section. Additionally, the distribution box supplies air from the air-conditioning unit to the first blowing section arranged on the first side via the first vent which opens toward the first side, while supplying air from the air-conditioning unit to the second blowing section arranged on the second side via the second vent which opens downward. In this manner, the distribution box supplies air from the air-conditioning unit to the second side via the second vent which opens downward, thus reducing the installation space in the horizontal direction. Furthermore, the second duct, which supplies air from the air-conditioning unit to the second blowing section from the second vent, is arranged below the seat, and therefore does not reduce the space inside the cab body.

Preferably, the distribution box is further provided with a partition plate in the box body. The partition plate controls the flow passage for air from the air-conditioning unit. According to this configuration, the partition plate may be used to adjust the airflow from the air-conditioning unit supplied to the first blowing section and the second blowing section, and may further facilitate balancing of the airflow from the air-conditioning unit blown out of the first blowing section and the second blowing section.

Preferably, the partition plate extends upward from the bottom of the box body, and in a plan view surrounds the second vent while opening toward the second side. The air introduced from the inlet into the box body from the air-conditioning unit will tend to flow toward the first vent, which opens into a location opposite the inlet. The first vent exhausts a larger amount of air from the air-conditioning unit than the second vent, which opens downward. With the partition plate configured as above described, the air introduced from the air-conditioning unit via the inlet is lead to the second vent, thereby allowing an increase in the airflow from the air-conditioning unit exhausted by the second vent. As a result, the airflow from the air-conditioning unit exhausted by the first vent can be made to approach the airflow from the air-conditioning unit exhausted by the second vent.

Preferably, the partition plate may be formed to create a gap between its top end and the ceiling of the box body. According to this configuration, even when the air vented from the air-conditioning unit into the distribution box has an uneven temperature, the air from the air-conditioning unit is mixed into the distribution box via the above described gap to a uniform temperature and is exhausted from the second vent.

Preferably, the second duct extends beneath the floor. According to this configuration, the cross-sectional area of the flow passage in the second duct may be increased without reducing the space inside the cab body.

Preferably, the second duct includes a duct body, and a heat insulating material that covers the periphery of the duct body. According to this configuration, the air from the air-conditioning unit that flows through the duct body may be maintained at a uniform temperature due to the heat insulating material.

Preferably, the first blowing section is arranged on one of either the right side or the left side of the seat, and the second blowing section is arranged on the other of the right side or the left side of the seat. According to this configuration, air from the air-conditioning unit may be blown toward the operator from the left and right sides.

Preferably, the box body further includes a third vent which opens toward the first side, and in a plan view the partition plate separates the first vent and the second vent, while separating the second vent and the third vent. According to this configuration, the airflow from the air-conditioning unit exhausted by the first vent, the airflow from the air-conditioning unit exhausted by the second vent, as well as the airflow from the air-conditioning unit exhausted by the third vent, may be made to approach each other.

Preferably, the work vehicle is further provided with a connecting duct that connects the air-conditioning unit to the inlet of the box body. According to this configuration, there is no need to install the box body adjacent to the air-conditioning unit since the air-conditioning unit and the box body may be connected via the connecting duct, thus increasing freedom in placement of the box body.

A work vehicle according to a second aspect of the present invention is provided with any of the above described cabs.

According to the present invention, it is possible to blow air from the air-conditioning unit onto the operator from both sides.

DESCRIPTION OF EXEMPLARY EMBODIMENTS

Figure 1:
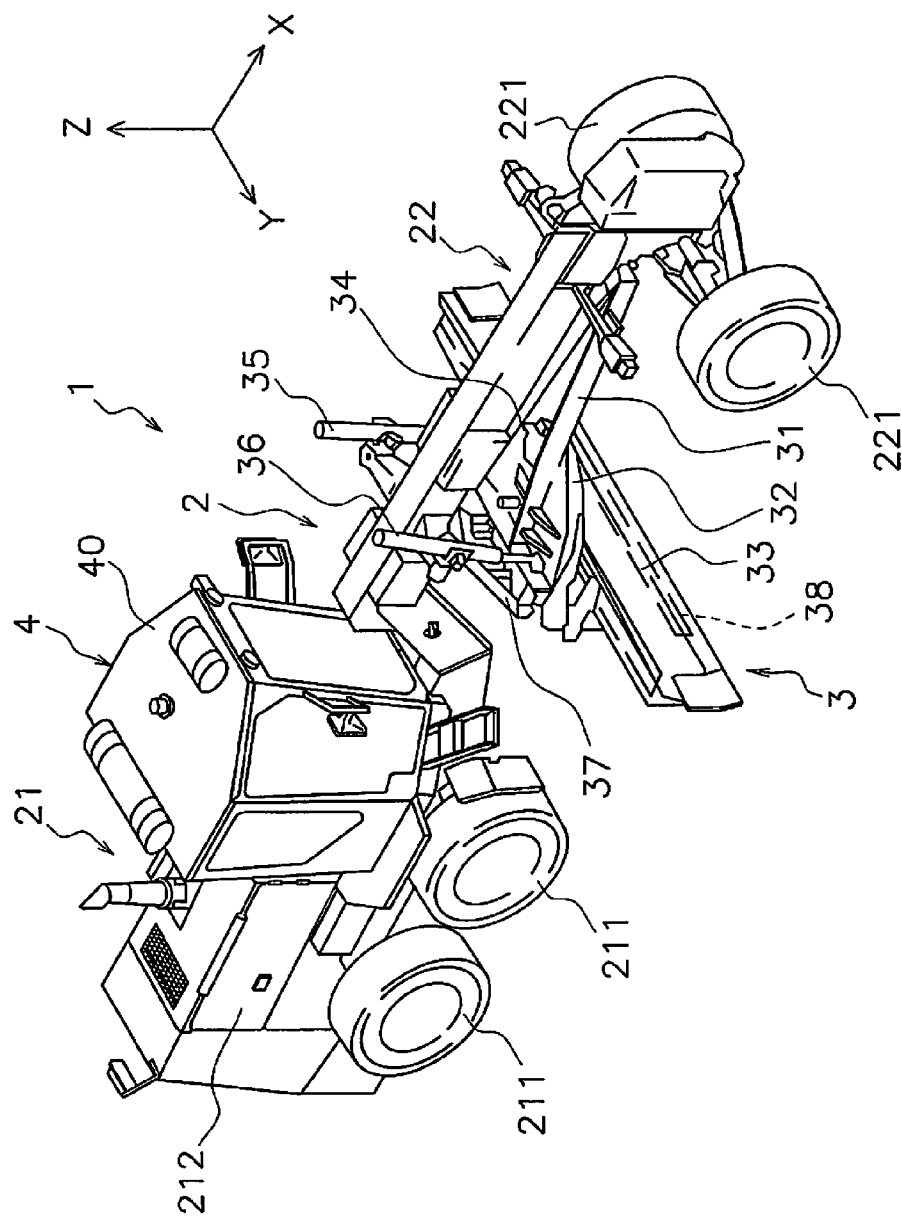
FIG. 1 is a perspective view of a motor grader.
Figure 2:
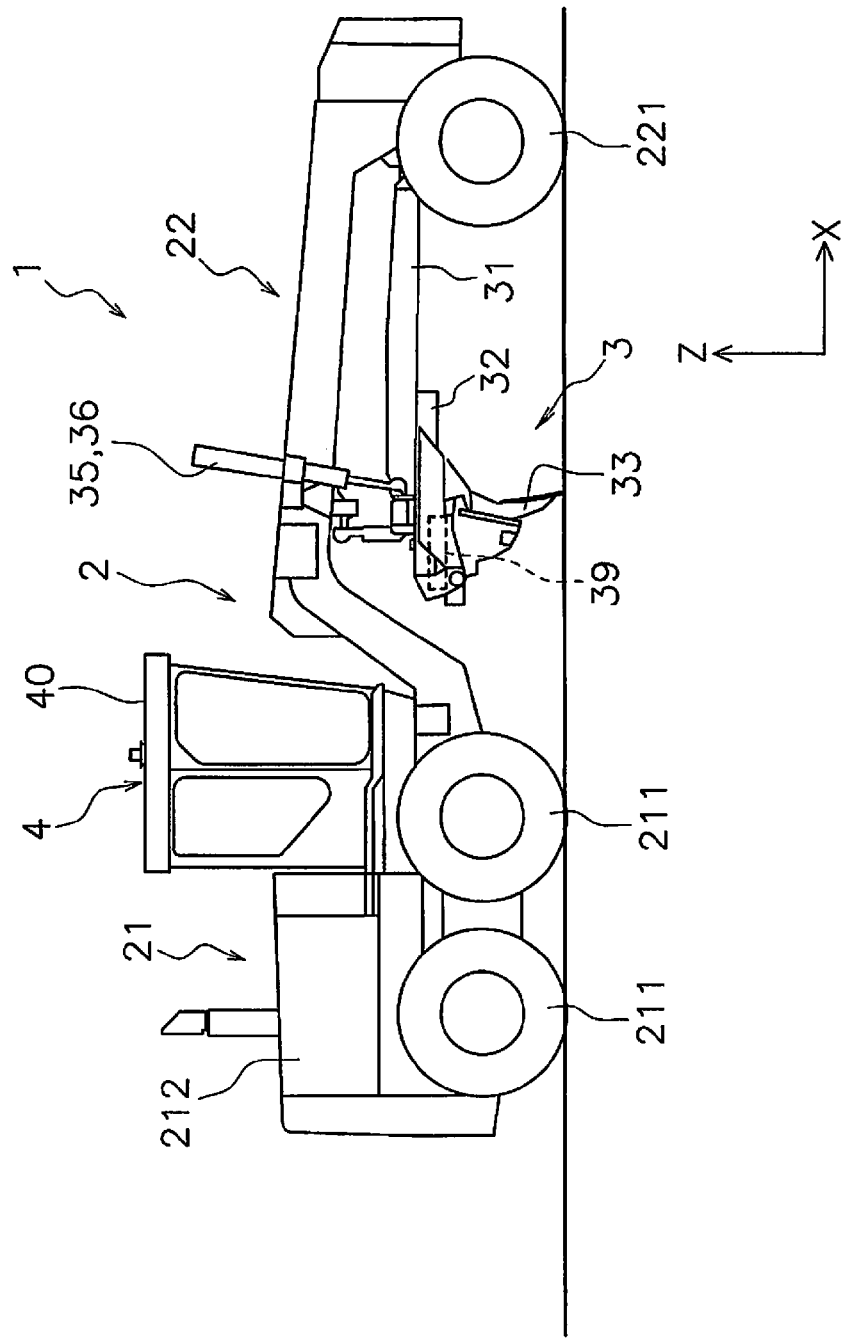
FIG. 2 is a side elevational view of the motor grader.

An exemplary embodiment of a motor grader 1, which is an example of a work vehicle according to the present invention, will be described below with reference to the drawings. FIG. 1 is a perspective view of the outside of the motor grader 1, and FIG. 2 is a side elevational view of the motor grader 1. In the following description, "front" and "rear" refer to the front and rear of the vehicle body 2. Namely, in FIG. 2 the right side is the "front", and the left side is the "rear". In addition, "right", "left", "up", and "down" in the following description represents directions when looking frontward from the driver's seat, and the terms "vehicle width direction" and "horizontal direction" have the same meaning. Finally, in the drawings, the longitudinal direction, the horizontal direction, and the vertical direction are represented by the X-axis, the Y-axis, and the Z-axis respectively.

As illustrated in FIG. 1 and FIG. 2, the motor grader 1 is provided with a vehicle body 2, a work implement 3, and a cab 4. The motor grader 1 may use the work implement 3 for soil preparation, snow removal, light cutting, or materials mixing.

The vehicle body 2 includes a rear vehicle body 21 and a front vehicle body 22. The rear vehicle body 21 includes a plurality of rear wheels 211 (for example, four). The rear wheels 211 are rotationally driven by power from an engine (not shown), causing the motor grader 1 to run. Further, the engine is housed inside an engine compartment 212 in the rear vehicle body 21. Additionally, a torque converter, a transmission, and the like (not shown) are housed inside the engine compartment 212. The torque converter is connected on the output side of the engine, and transmits power from the engine to the transmission. The transmission is connected on the output side of the torque converter. The transmission includes a clutch and a shift gear, and the like (not shown), and transmits power from the engine to the rear wheels 211 via a final speed reduction gear and a tandem device (not shown).

The front vehicle body 22 is arranged in front of the rear vehicle body 21. The front vehicle body 22 includes a plurality of front wheels 221 (for example, two). The front wheels 221 are arranged at the front of the front vehicle body 22.

The work implement 3 includes a draw bar 31, a circle 32, a blade 33, a hydraulic motor 34, and various hydraulic cylinders 35-39. The various hydraulic cylinders 35-39 include lift cylinders 35, 36; a draw bar shift cylinder 37; a blade shift cylinder 38; and a tilt cylinder 39 (refer to FIG. 2). The hydraulic motor 34 and the hydraulic cylinders 35-39 are driven by hydraulic fluid from a hydraulic pump (not shown).

The front of the draw bar 31 is attached to the front of the front vehicle body 22 and is able to swing. The pair of lift cylinders 35, 36 synchronously extend and retract to thereby cause the vertical raising and lowering of the rear of the draw bar 31. Additionally, the lift cylinders 35, 36 may cause the draw bar 31 to swing about a shaft along the longitudinal direction due to different extension and retraction thereof. Moreover, the draw bar 31 moves left and right in accordance with the extension and retraction of the draw bar shift cylinder 37.

The circle 32 is attached to the rear of the draw bar 31 for rotating. The circle 32 is driven by the hydraulic motor 34 (refer to FIG. 1). The circle 32 rotates in either a clockwise direction or a counter-clockwise direction in relation to the draw bar 31 when viewed from above the vehicle.

The blade 33 is supported to slide horizontally in relation to the circle 32. The blade 33 is supported to swing about an axis parallel to the horizontal direction in relation to the circle 32. The blade shift cylinder 38 moves the blade 33 horizontally in relation to the circle 32. Furthermore, the tilt cylinder 39 (refer to FIG. 2) swings the blade 33 about an axis parallel to the horizontal direction in relation to the circle 32. As above described, the blade 33 is raised and lowered vertically, changes inclination with respect to the longitudinal direction, changes inclination with respect to the horizontal direction, rotates, and shifts in the horizontal direction by way of the draw bar 31 and the circle 32.

Figure 3:
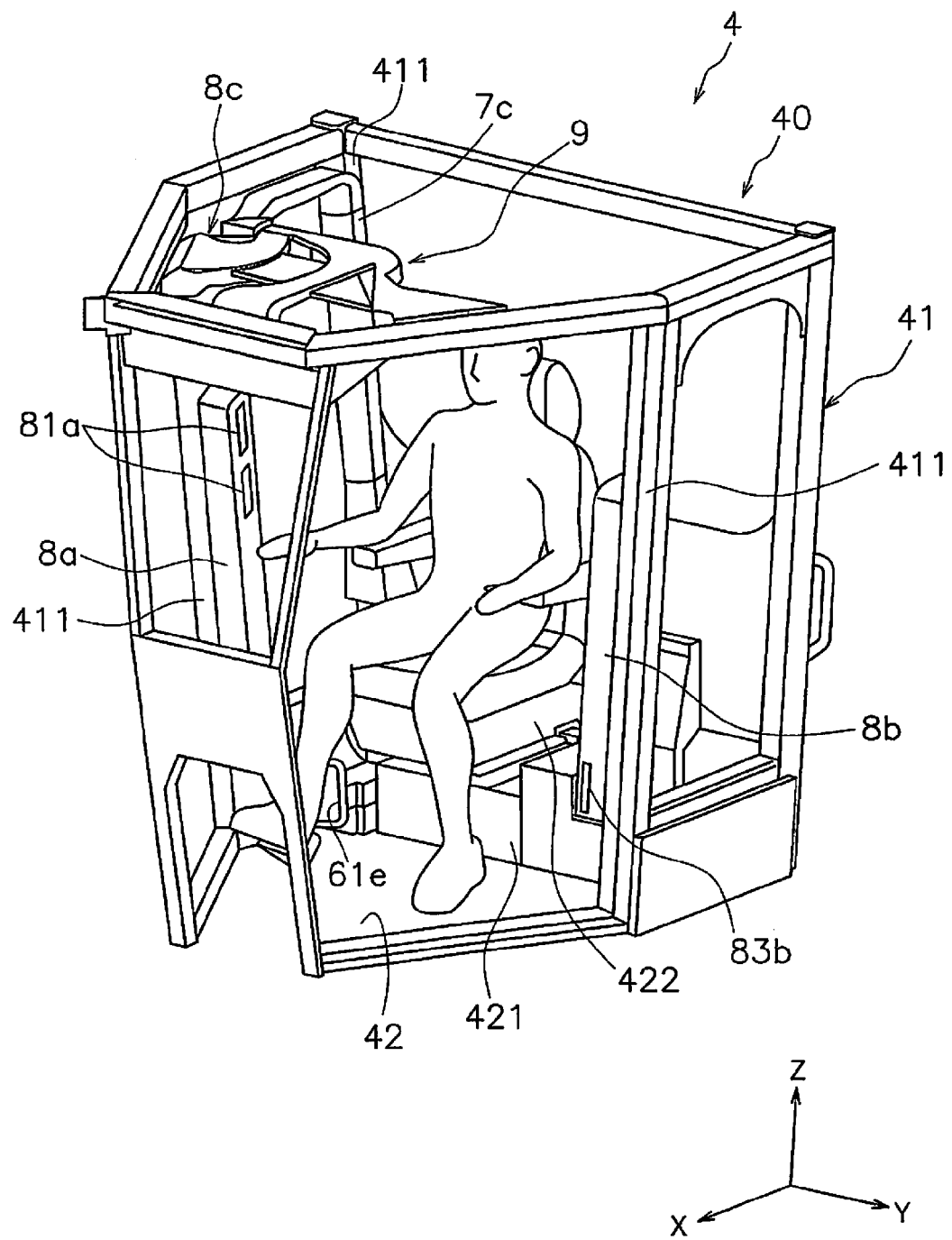
FIG. 3 is a perspective view of a cab.

FIG. 3 is a perspective view illustrating the details of the cab 4 when viewed from the left front. For the convenience of explanation, and so that the inside of the cab 4 may be properly understood, only a frame including pillars 411 is shown for the cab main section 41 in FIG. 3. The cab 4 is provided on the front vehicle body 22. The cab 4 may also be provided on the rear vehicle body 21. As illustrated in FIG. 3, the cab 4 includes a cab body 40 constituted by the cab main section 41 and a floor 42. The cab main section 41 is formed by the frame including the pillars 411 into the shape of a box where the bottom is open, The cab main section 41 is removably mounted on the floor 42. More specifically, the cab main section 41 is attached to the floor 42 using fastening members such as bolts.

The cab main section 41 includes a front window in front of a seat 422 (later described), a right door window at the front right of the seat 422, and a left door window at the front left of the seat 422. Additionally, the cab main section 41 includes a right window on the right side of the seat 422, a left window on the left side of the seat, and a rear window on the rear side of the seat 422. Finally, the cab 4 includes an operation control section 43 (refer to FIG. 6) for operating the work implement 3, and an air-conditioner subassembly 9 (later described) and so forth inside the cab body 40.

As illustrated in FIG. 3, the floor 42 defines the underside of the cab body 40, and seals the underside of the cab main section 41. The floor 42 is mounted on the front vehicle body 22, or the rear vehicle body 21. A pedestal 421, formed to be one step higher than the other sections, is installed on the floor 42 with the seat 422 removably mounted thereon.

Figure 4:
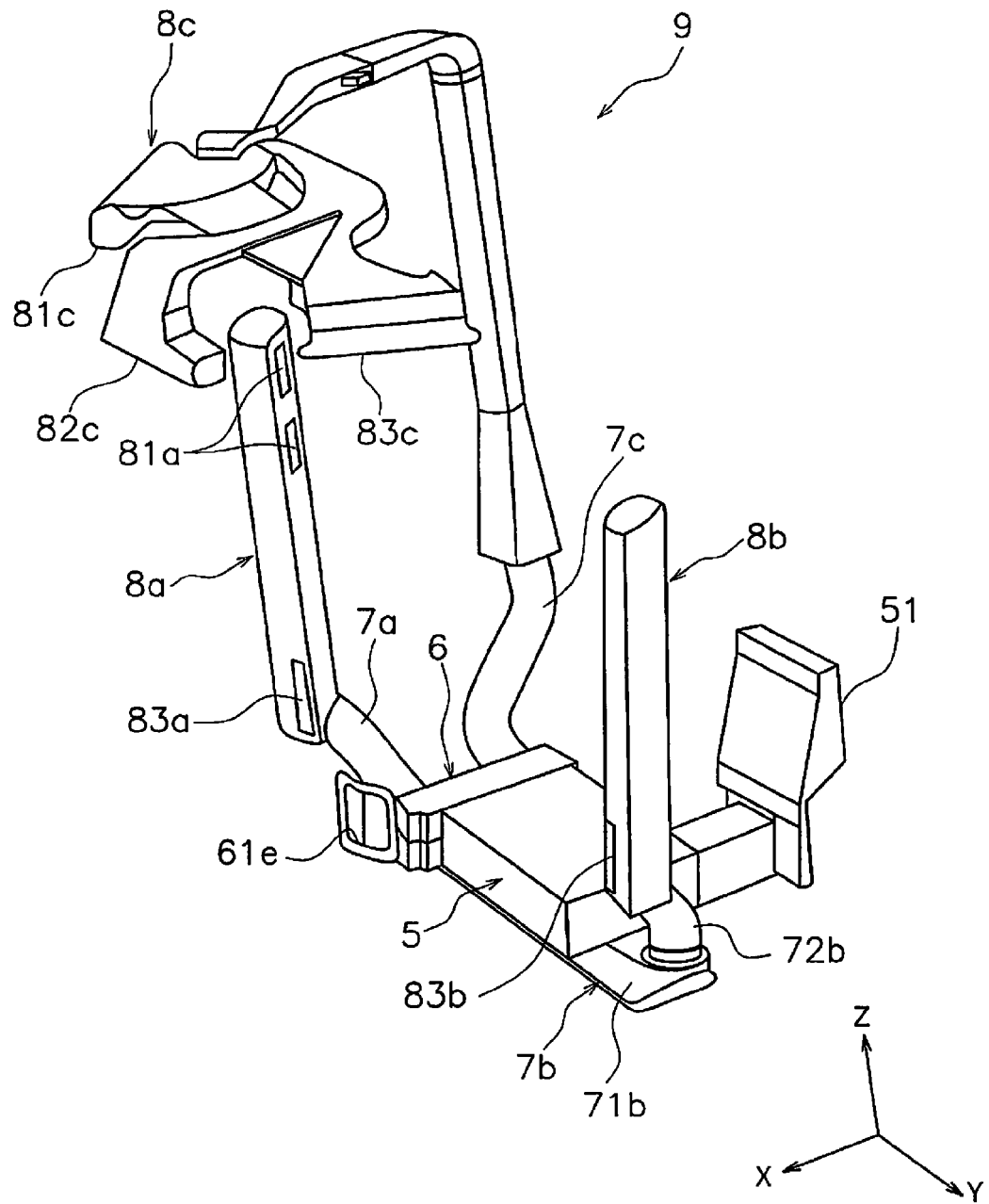
FIG. 4 is a perspective view of an air-conditioner subassembly.

FIG. 4 is a perspective view of the air-conditioner subassembly 9 as viewed from the front left. As illustrated in FIG. 4, the air-conditioner subassembly 9 is mainly constituted by an air-conditioning unit 5, the distribution box 6, ducts 7a-7c, and blowing components 8a-8c. With the exception of one portion of the second duct 7b, the air-conditioner subassembly 9 is fundamentally provided inside the cab body 40.

The air-conditioning unit 5 is arranged within the cab body 40 on the floor 42 beneath the seat 422. More specifically, the air-conditioning unit 5 is arranged inside the pedestal 421. The air-conditioning unit 5 exchanges heat between the air suctioned therein and a cooling medium to generate cool air or warm air. That is, the air-conditioning unit 5 is provided with a core unit and a fan. The core unit has a cooling medium flowing inside and generates cool air or warm air by heat exchange between the cooling medium and the air. The cooling medium may be for example ammonia, carbon dioxide, or warm water. The fan blows the generated cool air or warm air outside the air-conditioning unit 5. Additionally, the air-conditioning unit 5 includes a first intake unit (not shown) which suctions air from inside the cab body 40, and a second intake unit 51 which suctions air from outside the cab body 40. The first intake unit suctions air from inside the cab body 40 via an aperture formed in the pedestal 421. The second intake unit 51 opens outside of the cab body 40, and more specifically opens to a space between the cab body 40 and the engine compartment 212. The air-conditioning unit 5 may switch between suctioning only air from inside the cab body 40 via the first intake unit, or suctioning air from inside the cab body 40 and outside the cab body 40 via the first intake unit and the second intake unit 51. Finally, the air-conditioning unit 5 includes a vent (not shown) which exhausts the generated cool air and warm air.

Figure 5:
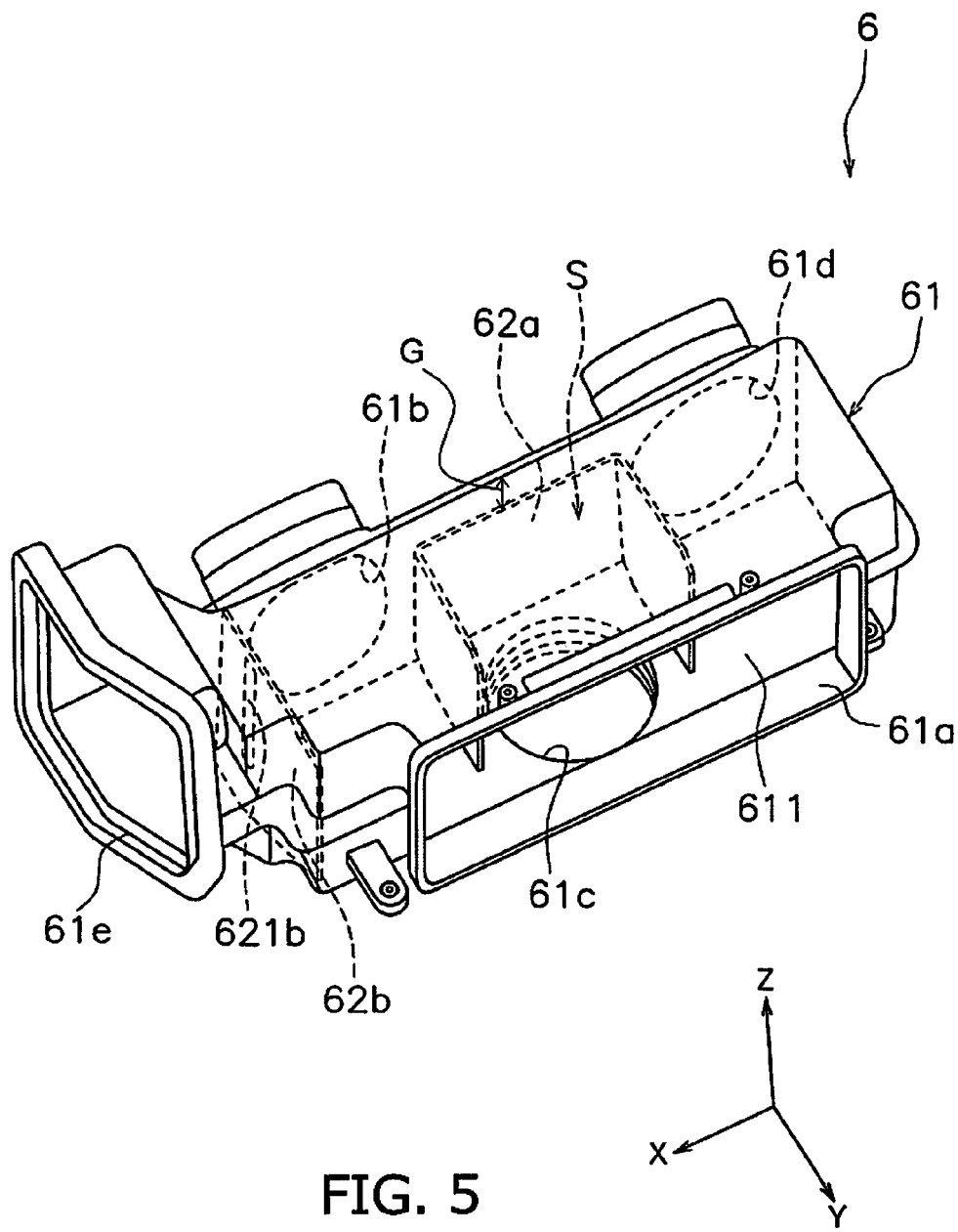
FIG. 5 is a perspective view of a distribution box.

FIG. 5 is a perspective view illustrating details of the distribution box 6 as viewed from the front left. The distribution box 6 distributes cool air or warm air exhausted from the air-conditioning unit 5, and is installed adjacent to the air-conditioning unit 5. As illustrated in FIG. 5, the distribution box 6 includes a box body 61, and first and second partition plates 62a, 62b installed inside the box body 61.

The box body 61 has a substantially rectangular parallelepiped shape with space on the inside, and extends in the longitudinal direction. Additionally the box body 61 is made from resin. An inlet 61a, and vents 61b-61e are formed in the box body 61.

The inlet 61a is formed to introduce cool air or warm air from the air-conditioning unit 5 into the box body 61. The inlet 61a opens toward the left side (one example of the second side) near the air-conditioning unit 5. More specifically, the inlet 61a is formed as the entire left side wall in the box body 61. The inlet 61a communicates with the vent in the air-conditioning unit 5.

The first vent 61b in the box body 61 opens towards the right side (one example of the first side) which is opposite the air-conditioning unit 5. More specifically, the first vent 61b is formed as a circular shape at the front portion of the right side wall of the box body 61.

The second vent 61c opens downward. More specifically, the second vent 61c is formed as a circular shape at the center of the bottom wall of the box body 61. The third vent 61d opens towards the right side (one example of the first side) which is opposite the air-conditioning unit 5. More specifically, the third vent 61d is formed as a circular shape at the rear of the right side wall of the box body 61. Accordingly, the first vent 61b, the second vent 61c, and the third vent 61d are formed in the box body 61 from the front in this order, and the first through third vents 61b-61d do not overlap with each other when viewed from the side.

Additionally, a fourth vent 61e, which opens to the front, is formed in the box body 61. More specifically, the fourth vent 61e is formed at the entire front wall in the box body 61.

The first and second partition plates 62a, 62b are installed inside the box body 61. The first partition plate 62a extends upward from the bottom 611 of the box body 61. In a plan view, the partition plate 62a surrounds the second vent 61c except for the side with the inlet 61a which is on the left side.

In a plan view, the first partition plate 62a is formed in three directions; that is, in front of, to the right of, and behind the second vent 61c. Additionally, the first partition plate 62a does not extend to the ceiling of the box body 61 such that a gap G is formed between the top end of the first partition plate 62a and the ceiling of the box body 61. The space S defined by the first partition plate 62a, and the bottom wall of box body 61 opens on the left side and at the top.

The second partition plate 62b is provided to completely divide the flow passage that connects the inlet 61a and the fourth vent 61e. A perforating slit 621b is formed extending vertically through the center of the partition plate 62b. Accordingly, cool air or warm air introduced from the inlet 61a is vented through only the perforating slit 621b towards the fourth vent 61e. Finally, the fourth vent 61e is formed to blow cool air or warm air toward the front of the pedestal 421. Therefore, the cool air or warm air blown from the fourth vent 61e is blown toward the feet of the operator sitting in the seat 422 in the cab 4.

As illustrated in FIG. 4, a first end portion of a first duct 7a is connected to the first vent 61b in the distribution box 6. A second end portion of the first duct 7a is connected to the first blowing component 8a. The first duct 7a connects the distribution box 6 and the first blowing component 8a. Furthermore, the first duct 7a is made from resin, and the cross-sectional area of the flow passage for the first duct 7a is not particularly limited.

The first blowing component 8a has a substantially rectangular parallelepiped shape with a cavity on the inside, and extends vertically. The first blowing component 8a is fixed to the pillars 411 of the cab main section 41 of the cab body 40, and is arranged on the right side of the seat 422 in the cab body 40. That is, the first blowing component 8a is arranged on the front right as viewed by the operator seated in the seat 422.

The first blowing component 8a is connected at the bottom end to the first duct 7a, and therefore the cool air or the warm air generated by the air-conditioning unit 5 is vented thereto by way of the distribution box 6 and the first duct 7a. The first blowing component 8a includes a plurality (for example, four) of first blowing sections 81a-83a. The first blowing sections 81a-83a function to blow out cool air or warm air vented into the first blowing component 8a toward the inside of the cab body 40. The first blowing sections 81a-83a will be described in detail below.

The two first blowing sections 81a formed in the left side wall of the first blowing component 8a at the upper portion of the first blowing component 8a are positioned at almost the same height as the face of the operator sitting in the seat 422. Further, the first blowing section 82a (refer to FIG. 6) formed in the rear wall of the first blowing component 8a at the lower portion of the first blowing component 8a is provided at an angle that allows cool air or warm air to be blown onto the right window located at the right side of the seat 422. Additionally, the first blowing section 83a (FIG. 4) formed in the front wall of the first blowing component 81a at the lower portion of the first blowing component 8a is provided at an angle that allows cool air or warm air to be blown onto the lower portion of the right door window located at the front right of the seat 422.

Figure 6:
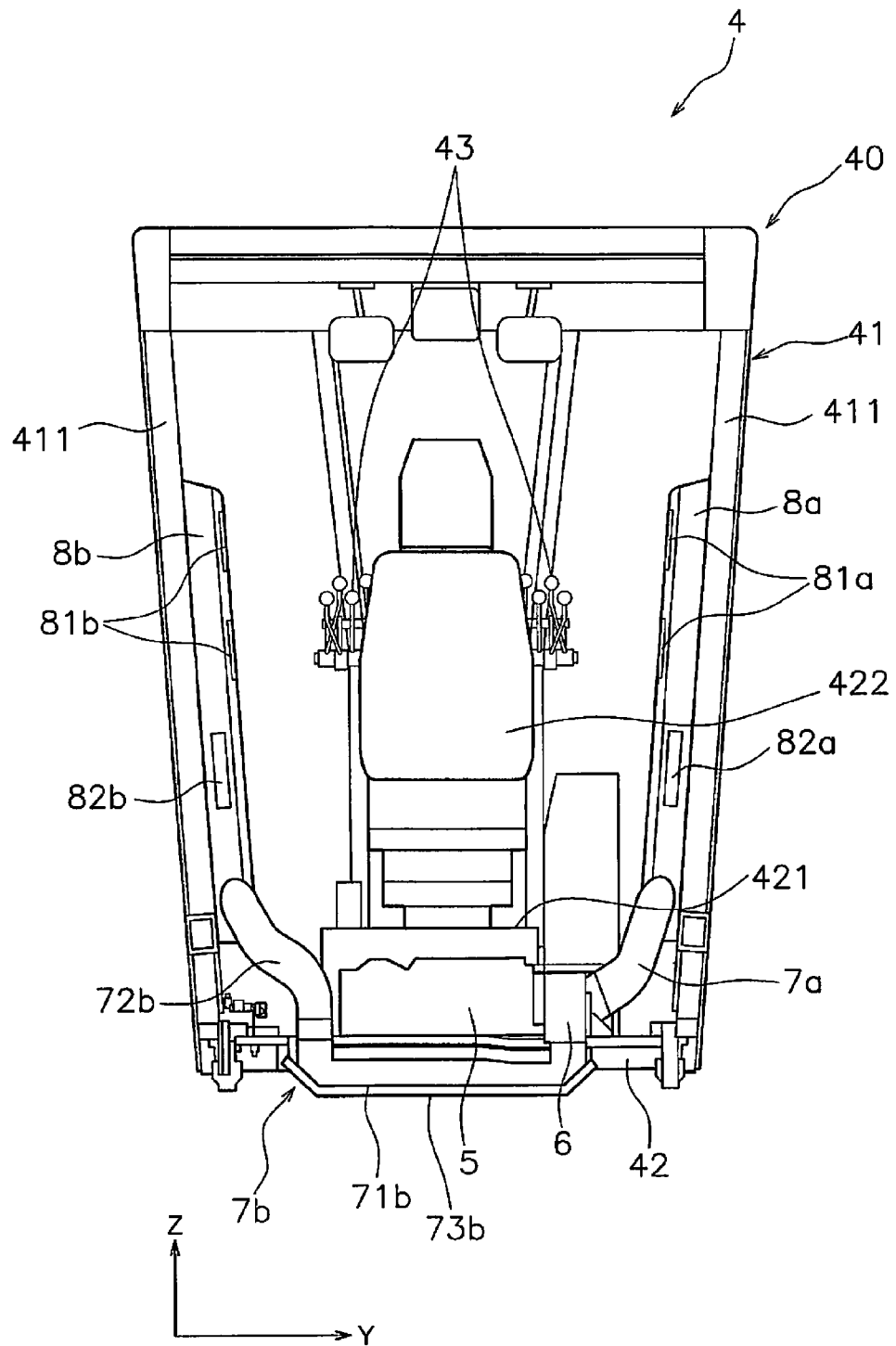
FIG. 6 is a rear elevational view of the cab.

FIG. 6 is a cross-sectional rear elevational view illustrating the cab 4 in detail. As illustrated in FIG. 6, a first end portion of a second duct 7b is connected to the second vent 61c of the distribution box 6, and a second end portion of the second duct 7b is connected to the second blowing component 8b. The second duct 7b connects the distribution box 6 and the second blowing component 8b.

The second duct 7b includes a duct body 71b that connects to the distribution box 6, and a connection portion 72b that connects to the second blowing section 8b. The duct body 71b is arranged beneath the floor 42 of the cab body 40. Namely the duct body 71b is exposed outside the cab body 40. The connection portion 72b is arranged inside the cab body 40.

Figure 7:
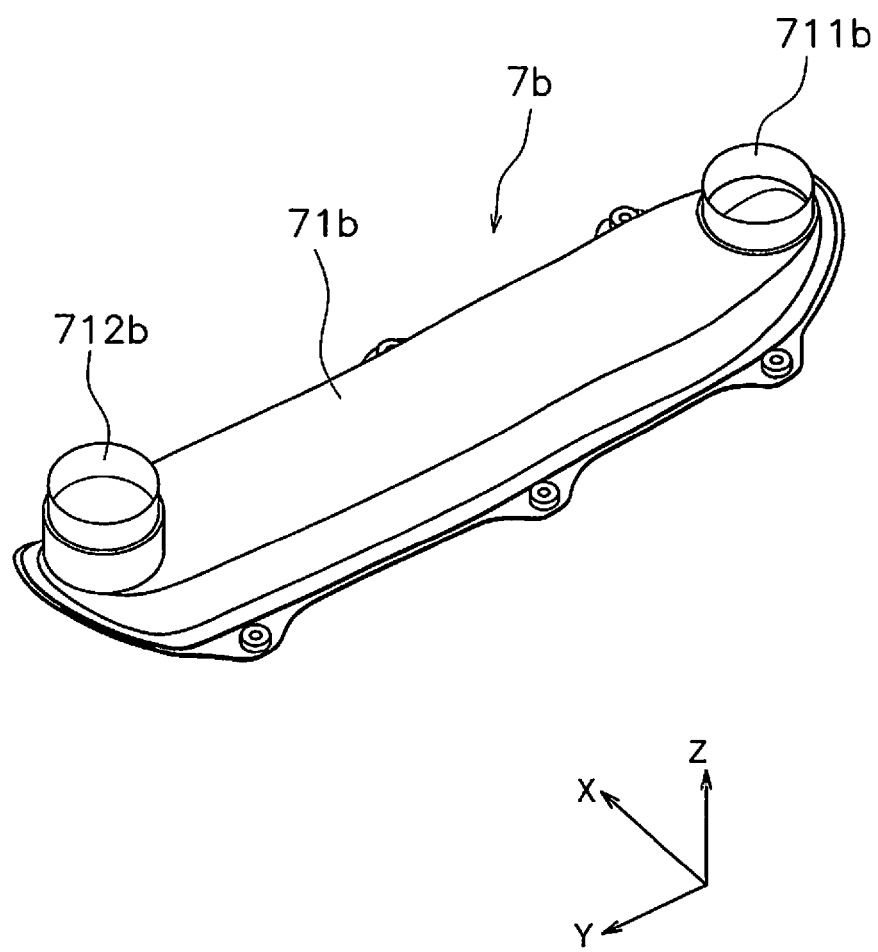
FIG. 7 is a perspective view of a duct body of a second duct.
Figure 8:
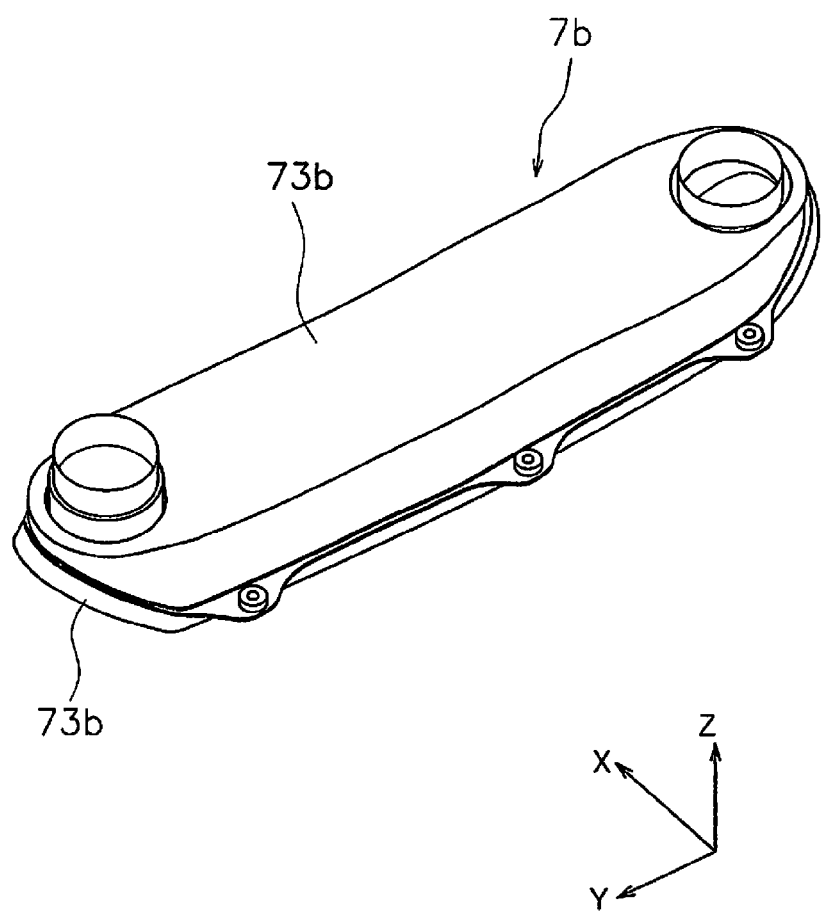
FIG. 8 is a perspective view of a heat insulating material installed on the duct body.

FIG. 7 is a perspective view of the duct body 71b of the second duct 7b viewed from the rear left. As illustrated in FIG. 7, the duct body 71b is made from resin and extends in the horizontal direction. The duct body 71 b communicates with the second vent 61c in the distribution box 6 via a first junction 711b formed in the right end part, and communicates with the connection portion 72b via a second junction 712b formed in the left end part. The second duct 7b further includes heat insulating material 73b that covers the periphery of the duct body 71b as illustrated in FIG. 8. The heat insulating material 73b may be, for example, formed from urethane foam. Moreover, the cross-sectional area of the flow passage for the duct body 71b and the connection portion 72b are not particularly limited.

As illustrated in FIG. 4, the second blowing component 8b has a rectangular parallelepiped shape with space on the inside, and extends in the vertical direction. The second blowing component 8b is fixed to the pillars 411 of the cab main section 41 of the cab body 40, and is arranged on the left side of the seat 422 in the cab body 40. That is, the second blowing component 8b is arranged on the front left as viewed by the operator seated in the seat 422.

The second blowing component 8b is connected at the bottom end to the second duct 7b, and therefore the cool air or the warm air generated by the air-conditioning unit 5 is vented thereto by way of the distribution box 6 and the second duct 7b. The second blowing component 8b includes a plurality (for example, four) of second blowing sections 81b-83b. The second blowing sections 81b-83b function to blow out cool air or warm air vented into the second blowing component 8b toward the inside of the cab body 40.

As illustrated in FIG. 6, the two second blowing sections 81b formed in the right side wall of the second blowing component 8b of the upper portion of the second blowing component 8b are positioned at almost the same height as the face of the operator sitting in the seat 422. Further, the second blowing section 82b formed in the rear wall of the second blowing component 8b at the lower portion of the second blowing component 8b is provided at an angle that allows cool air or warm air to be blown onto the left window located at the left side of the seat 422. Finally, as illustrated in FIG. 4, second blowing section 83b formed in the front wall of the second blowing component 8b at the lower portion of the second blowing component 8b is provided at an angle that allows cool air or warm air to be blown onto the lower portion of the left door window located at the front left of the seat 422.

As illustrated in FIG. 4, a first end portion of a third duct 7c is connected to the third vent 61d of the distribution box 6, and a second end portion of the third duct 7c is connected to the third blowing component 8c. The third duct 7c connects the distribution box 6 and the third blowing component 8c. The third duct 7c extends up to the ceiling of the cab body 40 along the pillar 411 at the rear right of the cab main section 41 in the cab body 40, and extends along the ceiling of the cab body 40 to the front connecting to the third blowing component 8c. Finally, the third duct 7c is made from resin.

The third blowing component 8c is provided in front of the ceiling of the cab body 40. To blow cool air or warm air from above onto the front window, the left door window, and the right door window of the cab body 40, the third blowing component 8c includes three third blowing sections 81c-83c, as shown in FIG. 4.

Next, the operations will be described of the air-conditioner subassembly 9 when cooling the inside of the cab body 40 of a motor grader 1 having the above described configuration.

First, when the cooling operation starts, the air-conditioning unit 5 takes in the air inside the cab body 40 by way of the first intake unit, and performs heat exchange between the air taken in and the cooling medium flowing through the core portion to thereby cool the air. The air-conditioning unit 5 then uses the fan to exhaust the cooled air from the vent, thus generating cool air.

The cool air generated by the air-conditioning unit 5 is vented into the box body 61 of the distribution box 6 via the inlet 61a. The cool air vented to the box body 61 of the distribution box 6 is mixed inside the box body 61, to thereby remove any temperature inconsistencies within the cool air and create cool air having a uniform temperature.

One portion of the cool air supplied to the box body 61 is vented to the first blowing component 8a via the first vent 61b and the first duct 7a, and blown out from the first blowing sections 81a-83a in the first blowing component 8a. Moreover, the first blowing section 81a formed in the left side wall at the upper portion of the first blowing component 8a blows the cool air from the front right toward an operator sitting in the seat 422, and more particularly toward the operator's face. Moreover, the first blowing section 82a formed in the rear wall at the lower portion of the first blowing component 8a blows the cool air onto the right window. This prevents fogging of the right window. Finally, the first blowing section 83a formed in the front wall at the lower end portion of the first blowing component 8a blows the cool air onto the lower portion of the right door window. This thus prevents fogging of the right door window.

In addition, one portion of the cool air supplied to the box body 61 of the distribution box 6 is vented to the second blowing component 8b via the second vent 61c and the second duct 7b, and blown out from the second blowing sections 81b-83b in the second blowing component 8b. The second blowing section 81b formed in the right side wall at the upper portion of the second blowing component 8b blows the cool air from the front left toward the operator sitting in the seat 422, and more particularly toward the operator's face. Moreover, the second blowing section 82b formed in the rear wall at the lower portion of the second blowing component 8b blows the cool air onto the left window. This prevents fogging of the left window. Finally, the second blowing section 83b formed in the front wall at the lower end portion of the second blowing component 8b blows the cool air onto the lower portion of the left door window. This prevents fogging of the left door window.

In addition, one portion of the cool air supplied to the box body 61 of the distribution box 6 is vented to the third blowing component 8*c* via the third vent 61*d* and the third duct 7*c*, and blown out from the third blowing sections 81*c*-83*c* in the third blowing component 8*c*. The third blowing section 81*c* formed at the right end portion of the third blowing component 8*c* blows the cool air from above onto the right door window. This prevents fogging of the right door window. The third blowing section 82*c* formed at the center portion of the third blowing component 8*c* blows the cool air from above onto the front window. This prevents fogging of the front window. Further the third blowing section 83*c* formed at the left end portion of the third blowing component 8*c* blows the cool air from above onto the left door window. This prevents fogging of the left door window.

In addition, one portion of the air supplied to the box body 61 of the distribution box 6 is blown from the fourth vent 61*e* into the cab body 40. Thereby, air may be vented toward the operator's feet. There are no ducts or blowing components provided for blowing cool air onto the rear window which is located behind the seat 422. This secures space near the rear window. Finally, the rear window may be provided with heating wires to prevent fogging of the rear window.

The above description relates to the operation of the air-conditioner subassembly 9 when the air-conditioner subassembly 9 cools the cab body 40. The operation of the air-conditioner subassembly 9 when heating the inside of the cab body 40 merely involves changing cool air to warm air such that all other operations are basically the same.

Features

A motor grader 1 according to the present exemplary embodiment has the following features.

The first blowing section 81*a* formed in the upper portion of the first blowing component 8*a* blows cool air or warm air from the right side onto an operator sitting in the seat 422. The second blowing section 81*b* formed in the upper portion of the second blowing component 8*b* blows cool air or warm air from the left side onto an operator sitting in the seat 422. In this manner, the first and second blowing sections 81 a, 81 b blow cool air or warm air from both sides onto the operator. Additionally, the distribution box 6 supplies cool air or warm air to the first blowing section 81*a* arranged on the right side via the first vent 61*b* which opens toward the right side, while the distribution box 6 supplies cool air or warm air to the second blowing section 81*b* arranged on the left side via the second vent 61*c* which opens downward. In this manner, the distribution box 6 provides cool air or warm air on the left side via the second vent 61*c* which opens downward, and therefore the second duct 7*b* connected to the second vent 61*c* extends slightly downwards and then extends to the left side. Namely, the installation space in the horizontal direction can be reduced given that the second duct 7*b* does not extend towards the right. Furthermore, the second duct 7*b*, which supplies cool air or warm air to the second blowing section 81*b* from the second vent 61*c*, is arranged below the seat, and therefore does not reduce the space inside the cab body 40.

A first partition plate 62*a* is installed within the box body 61 of the distribution box 6 to control the flow passage for the cool air or warm air flowing within the box body 61 such that the air volume of the cool air or warm air supplied to the first blowing section 81*a* and the second blowing section 81*b* can be adjusted. As a result, it is possible to improve the balance of the airflow from the first blowing section 81 a and the second blowing section 81 b.

The first partition plate 62*a* extends upward from the bottom of the box body 61, and in a plan view surrounds the second vent 61*c* while opening towards the left side (the inlet 61*a* side). With the first partition plate 62*a* configured in this manner, the cool air or warm air introduced into the box body 61 from the inlet 61*a* is led towards the second vent 61*c* such that the volume of cool air or warm air exhausted via the second vent 61*c* can be increased. Hereby, the volume of cool air or warm air exhausted via the first vent 61*b* can be made to approach the volume of cool air or warm air exhausted by the second vent 61*c*.

The first partition plate 62*a* is formed so that there is a gap G between the top end of the first partition plate 62*a* and the ceiling of the box body 61, so that even when the cool air or warm air vented from the air-conditioning unit 5 is an uneven temperature, the air is mixed in the box body 61 via the above described gap G so that cool air or warm air having a uniform temperature may be exhausted from the second vent 61*c* and the like.

The second duct 7*b* extends beneath the floor 42 of the cab body 40, and therefore the cross-sectional area of the flow passage in the second duct 7*b* may be increased without reducing the space inside the cab body 40.

The second duct 7*b* includes the duct body 71*b* and the heat insulation material 73*b* that covers the periphery of the duct body 71*b*, therefore, the cool air or warm air flowing inside the duct body 71*b* can be maintained at a constant temperature due to the heat insulating material 73*b*.

MODIFICATION EXAMPLES

The above-described exemplary embodiment of the present invention is not limited to these descriptions, but may be modified in various ways insofar as the modifications do not deviate from the spirit of the present invention.

First Modification Example

For example, the first partition plate 62*a* need not be particularly limited to the shape and form in the above mentioned exemplary embodiment as long as it is of a shape and form that allows the cool air or warm air introduced into the box body 61 to be lead to the second vent 61*c*.

Second Modification Example

The number of vents formed in the box body 61 of the distribution box 6 in the above mentioned exemplary embodiment, and the number of blowing sections provided in the blowing components, and so forth need not be particularly limited to the above mentioned exemplary embodiment.

Third Modification Example

Although the above mentioned exemplary embodiment presents and describes a motor grader 1 adopting the present invention as one example, the types of work vehicles in which the present invention may be adopted, need not be limited to the motor grader 1.

For example, the present invention may be applied to an excavator, a bulldozer, or a wheel loader, and so forth.

Fourth Modification Example

Although the box body 61 of the distribution box 6 in the above mentioned exemplary embodiment has a substantially rectangular parallelepiped shape, the box body 61 need not be particularly limited to this shape. For example, the box body 61 may include a cylindrical bellows segment, and the inlet 61a may be formed on the tip of this bellows segment.

Fifth Modification Example

Figure 9:
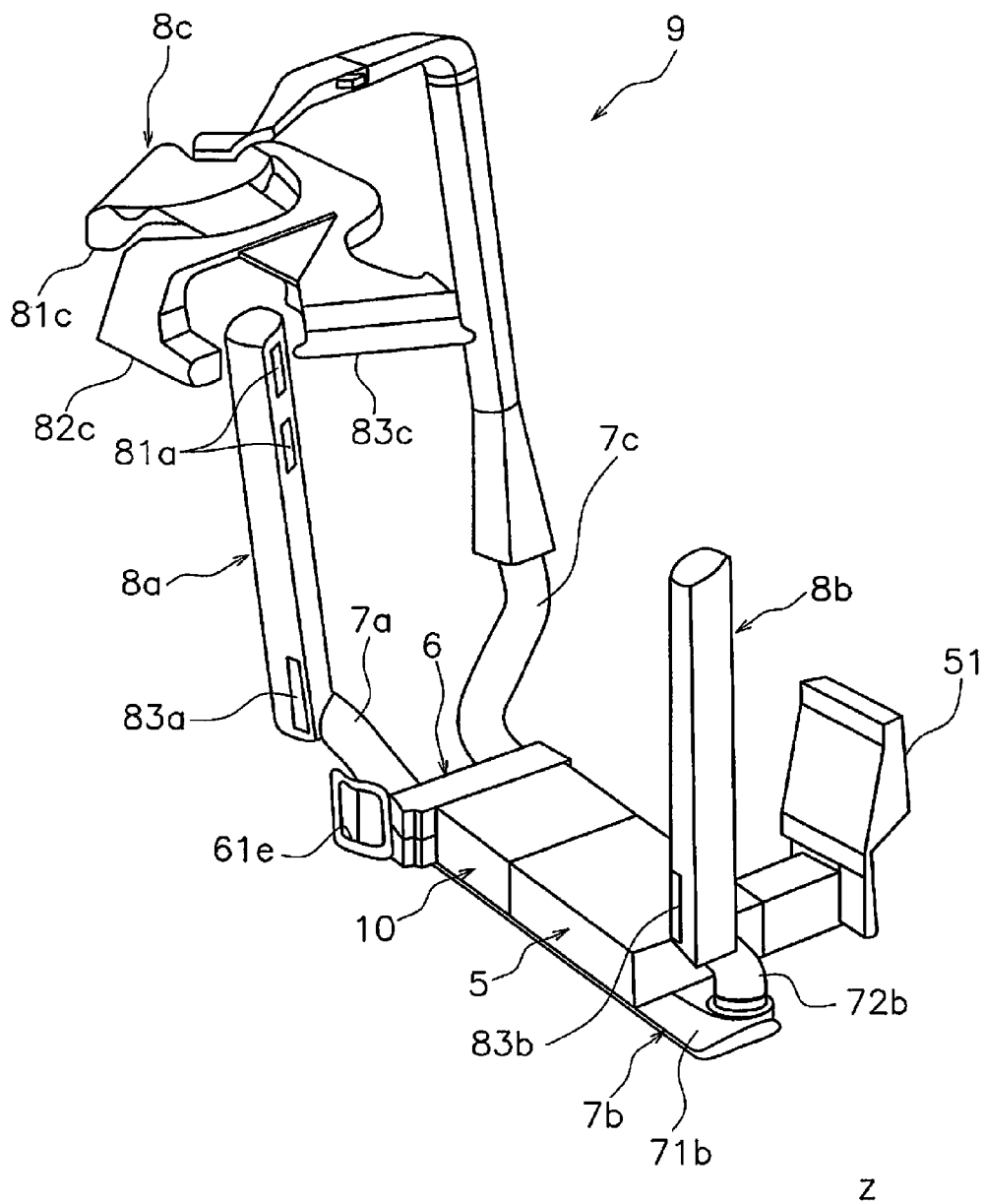
FIG. 9 is a perspective view of an air-conditioner subassembly according to another exemplary embodiment.

Although the air-conditioning unit 5 and the distribution box 6 are directly connected in the above mentioned exemplary embodiment, without being limited to this configuration, for instance as illustrated in FIG. 9, the air-conditioning unit 5 and the distribution box 6 may be connected via a connecting duct 10 interposed therebetween. The connecting duct 10, which has a bellows shape, connects the vent in the air-conditioning unit 5 and the inlet 61a in the distribution box 6.

The invention claimed is:

1. A cab comprising:
  a cab body including a floor;
  a seat installed inside the cab body;
  an air-conditioning unit arranged on the floor beneath the seat;
  a first blowing section arranged inside the cab body on a first side in a vehicle width direction for blowing air from the air-conditioning unit;
  a second blowing section arranged inside the cab body on a second side opposite the first side for blowing air from the air-conditioning unit;
  a distribution box including a box body having formed therein an inlet opening toward the second side for introducing air from the air-conditioning unit, a first vent opening toward the first side, and a second vent opening downwardly;
  a first duct connected to the first vent for supplying the first blowing section with air from the air-conditioning unit; and
  a second duct connected to the second vent and extending toward the second side for supplying the second blowing section with air from the air-conditioning unit, the second duct passing underneath the air-conditioning unit between the second vent of the distribution box and the second blowing section.

2. The cab according to claim 1, wherein
  the distribution box is further provided with a partition plate in the box body, and the partition plate controls the flow passage for air from the air-conditioning unit.

3. The cab according to claim 2, wherein
  the partition plate extends upward from the bottom of the box body, and in a plan view surrounds the second vent while opening toward the second side.

4. The cab according to claim 1, wherein the second duct extends beneath the floor.

5. The cab according to claim 4, wherein
  the second duct includes a duct body, and a heat insulating material that covers the periphery of the duct body.

6. The cab according to claim 1, wherein
  the first blowing section is arranged on one of either the right side or the left side of the seat, and
  the second blowing section is arranged on the other of the right side or the left side of the seat.

7. The cab according to claim 3, wherein
  the box body includes a third vent which opens toward the first side, and
  in a plan view the partition plate separates the first vent and the second vent, and separates the second vent and the third vent.

8. The cab according to claim 1, further comprising:
  a connecting duct that connects the air-conditioning unit and the inlet of the box body.

9. A work vehicle comprising: the cab according to claim 1.

10. The cab according to claim 7, further comprising:
  a connecting duct that connects the air-conditioning unit and the inlet of the box body.

11. A work vehicle comprising: the cab according to claim 10.

12. The cab according to claim 1, wherein
  the distribution box is arranged between the air conditioning unit and the first blowing section in the vehicle width direction, and
  the air conditioning unit is arranged between the distribution box and the second blowing section in the vehicle width direction.

13. The cab according to claim 1, wherein
  the second duct extends in the vehicle widthwise direction from the second vent to the second blowing section.

14. A cab comprising:
  a cab body including a floor;
  a seat installed inside the cab body;
  an air-conditioning unit arranged on the floor beneath the seat;
  a first blowing section arranged inside the cab body on a first side in a vehicle width direction for blowing air from the air-conditioning unit;
  a second blowing section arranged inside the cab body on a second side opposite the first side for blowing air from the air-conditioning unit;
  a distribution box including a box body and a partition plate arranged inside the box body, the box body having formed therein an inlet opening toward the second side for introducing air from the air-conditioning unit, a first vent opening toward the first side, and a second vent formed in a bottom wall of the box body and opening downwardly;
  a first duct connected to the first vent for supplying the first blowing section with air from the air-conditioning unit; and
  a second duct connected to the second vent and extending toward the second side for supplying the second blowing section with air from the air-conditioning unit,
  the partition plate extending upward toward a ceiling of the box body from an inner surface of the bottom wall inside the box body and being configured to partially surround the second vent while being open toward the inlet opening, the partition plate not reaching the ceiling of the box body such that a gap is disposed between a top end of the partition plate and the ceiling of the box body.

15. The cab according to claim 14, wherein the second duct extends beneath the floor.

16. The cab according to claim 15, wherein
  the second duct includes a duct body, and a heat insulating material that covers the periphery of the duct body.

17. The cab according to claim 16, wherein
  the first blowing section is arranged on one of either the right side or the left side of the seat, and
  the second blowing section is arranged on the other of the right side or the left side of the seat.

18. The cab according to claim 17, further comprising:
  a connecting duct that connects the air-conditioning unit and the inlet of the box body.

19. A work vehicle comprising: the cab according to claim 18.

20. The cap according to claim 14, wherein
  the partition plate has three sections that extend in three different directions in a plan view.

* * * * *